US006356907B1

(12) United States Patent
Hopmann

(10) Patent No.: US 6,356,907 B1
(45) Date of Patent: Mar. 12, 2002

(54) PROVIDING FOR DATA TYPES OF PROPERTIES ACCORDING TO STANDARD REQUEST-RESPONSE PROTOCOLS

(75) Inventor: Alexander I Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,199

(22) Filed: Jul. 26, 1999

(51) Int. Cl.$^7$ ............................................... G06F 17/30
(52) U.S. Cl. ..................... 707/10; 707/513; 345/733; 345/751; 345/760
(58) Field of Search .................. 707/1–4, 10, 100–103, 707/501, 513, 501.1; 709/217–219; 717/1.5; 345/733, 751, 760

(56) References Cited

U.S. PATENT DOCUMENTS 6,083,276 A * 7/2000 Davidson et al. ............... 717/1
6,253,366 B1 * 6/2001 Mutschler, III ................. 717/1

OTHER PUBLICATIONS

HTTP Working Group Internet Draft dated Nov. 18, 1998, prepared by Fielding, et al., available on the web site http://www.w3.org. [Chapter 1 is specifically provided].
W3C Recommendation REC–xml–1998–0210 dated Feb. 10, 1998, and available on the web site http://www.w3.org.
E. James Whitehead Jr., World–Wide–Web Distributed Authoring and Versioning (WebDAV): An Introduction, in StandardView, vol. 5, No. 1, Mar. 1997, pp. 3–8.
Internet Engineering Task Force (IETF) Request for Comment (RFC) 2518, entitled HTTP Extensions for Distributed Authoring, by Y. Goland, E. Whitehead, A. Faizi, S. Carter and D. Jensen, dated Feb. 1999.
ISO/IEC 9075:1992, Database Language SQL, Jul. 30, 1992, available from and produced by the International Organization for Standardization (ISO) in liason with the International Electrotechnical Commission (IEC), specifically the Joint Technical Committee ISO/IEC JTC1, Information Processing Systems. [Introduction is specifically provided].

Chris Date and Hugh Darwen, A Guide to the SQL Standard: A User's Guide to the Standard Database Language SQL, Apr. 1997, ISBN 0201964260.

Internet Web Site http://www.microsoft.com/data/oledb/, last updated Mar. 17, 1999.

Internet Web Site http://www.microsoft.com/data/oledb/oledb20/, printed Jul. 23, 1999.

Internet Web Site http://www.microsoft.com/com/, printed Jul. 23, 1999.

Internet Web Site http://www.microsoft.com/com/about.asp, printed Jul. 23, 1999.

Network Working Group Request for Comment (RFC) 1738 entitled Uniform Resource Locators (URL), by T. Berners–Lee, L. Masinter, M. McCahill, dated Dec. 1994.

Network Working Group Request for Comment (RFC) 2396 entitled Uniform Resource Identifiers (URI): Generic Syntax, by T. Berners–Lee, R. Fielding, L. Masinter, dated Aug. 1998.

"XML: A Door to Automated Web Applicatins," Khare et al., IEEE Internet Computing, vol. 1, Issue 4, pp. 78–87, Jul. 1997.*

* cited by examiner

Primary Examiner—Hosain T. Alam
(74) Attorney, Agent, or Firm—Workman, Nydegger, Seeley

(57) ABSTRACT

Data types of properties for resources of standard request-response protocols such as HTTP is disclosed. In one embodiment, a method specifies a command, such as a PROPPATCH command, a PROPFIND command, or a SEARCH command. At least one value of a data type for a property within the command is set, and the command is output according to a request-response protocol. The outputting of the command may also be in accordance with a predetermined markup language, such as XML.

20 Claims, 3 Drawing Sheets

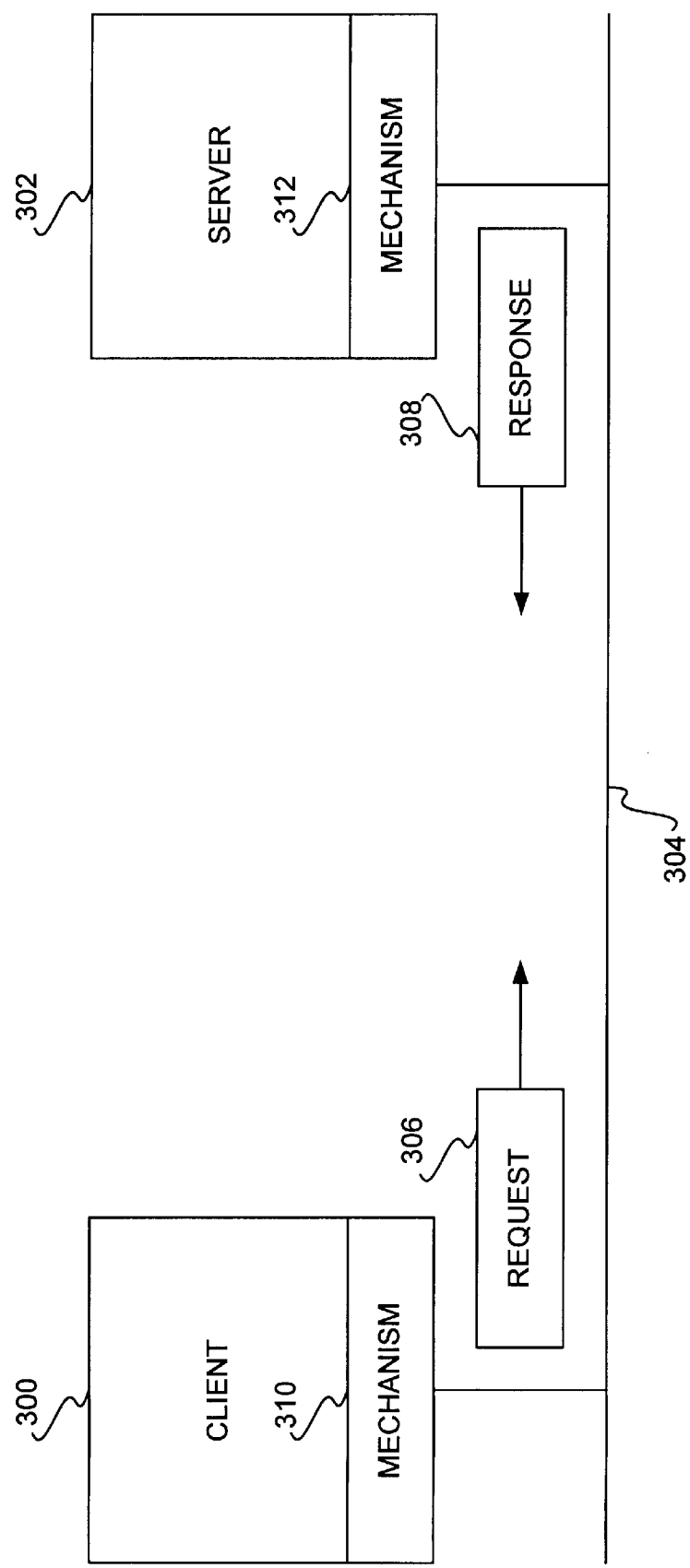

PROVIDING FOR DATA TYPES OF PROPERTIES ACCORDING TO STANDARD REQUEST-RESPONSE PROTOCOLS

FIELD OF THE INVENTION

This invention relates generally to standard request-response protocols such as the HyperText Transport Protocol (HTTP), and more specifically to providing for data types of properties according to such standard request-response protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the Request For Comment (RFC) 2616, available on the web site http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is extensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

HTTP, and hence XML in the context of HTTP, allows for the access of resources. The term resource refers to any piece of information that has a location described by a Uniform Resource Locator (URL) of the form HTTP://<domain>.<extension>, where <domain> specifies a particular domain, and <extension> can be, for example, .com, .edu, and .net, among others. A resource can be, for example, a Web page, a document, a database, a bitmap image, or a computational object. The definition of URL is described in the references Request for Comment RFC 1738 and Request for Comment 2396, also available from http://www.w3.org.

Recently, extensions to HTTP have been proposed that allow for, among other things, the setting and retrieval of properties for resources. A property is specifically a name/value pair that contains descriptive information about a resource. More generally, a property is any information about a resource. Thus, properties provide for the ability to create, remove, and query such information about resources, such as their authors, creation dates, etc. Properties also provide for the ability to link web pages of any media type to other related web pages.

These extensions are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages. WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. The part of WEBDav that describes the setting and enumerating of properties is described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. More generally, this reference specifies a set of methods, headers and content-types ancillary to HTTP/1.1 for the management of resource properties, creation and management of resource collections, name space manipulation, and resource locking (also referred to as collision avoidance).

A limitation to these extensions that provide for properties of resources is that they do not provide for data typing of the properties. Data typing generally refers to the providing of a data type to a resource, such as string, integer, floating point (real number), as well as newly defined data types. A data type for a property can allow a computer accessing the property to know how to handle the property. For example, two integers can be added together, while addition does not make sense for two strings. However, under WebDAV, data typing is not provided for at the property level of a resource. This means that while computers can access properties of resources, they cannot determine what sort of operations, for example, that can be used on these properties. This limits the usefulness of properties. For these and other reasons, there is a need for the present invention.

SUMMARY OF THE INVENTION

The invention provides for data types of properties of resources according to standard request-response protocols such as HTTP. For example, in one embodiment, a method specifies a command, such as a PROPPATCH command, a PROPFIND command, or a SEARCH command, as known within the art. At least one value of a data type for a property within the command is set, and the command is then output according to a predetermined request-response protocol, such as HTTP. In one embodiment, the outputting of the command is also according to a predetermined markup language, such as XML.

Embodiments of the invention therefore provide for advantages not found in the prior art. Computers coupled to TCP/IP-compliant networks such as the Internet, intranets, and extranets can access properties of resources, and learn of and set data types of such properties. Because Internet connectivity is becoming increasingly standard for computers, this means that that the invention provides for improved usefulness of the Internet as a readable and writable collaborative medium.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
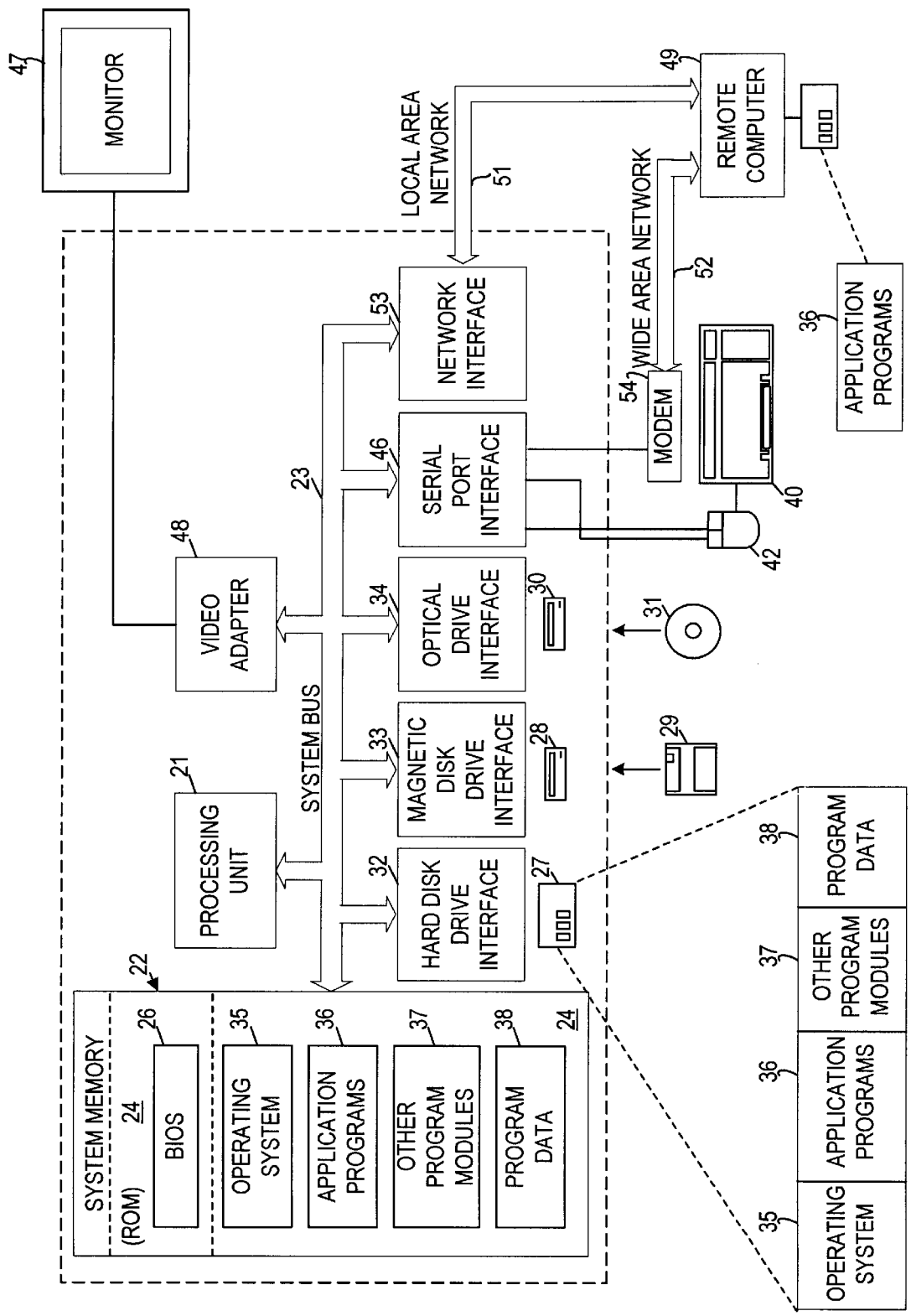
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Data Types of Properties of Resources

In this section of the detailed description, data types of properties of resources, according to varying embodiment of the inventions, are described. In further sections, methods and system according to embodiments of the invention are presented. The description of data types of properties of resources is made in conjunction with the presentation of an illustrative example, according to XML and HTTP. While the example is specific to XML and HTTP, the invention is not so limited, and is applicable to any predetermined markup language and transport protocol. The example is:

PROPPATCH/<url>/HTTP/1.1
Content-Type: text/xml

<PROPPATCH xmlns="mynamespace">
   <SET>
     <PROP><myprop dt:dt="bin.base64">y</myprop></PROP>
   </SET>
</PROPPATCH>

In this example, the command is the HTTP command PROPPATCH, which specifies the properties for a resource within a given space, referred to as a name space, and located at a given location. The location of the resource is specified by <url>. HTTP/1.1 specifies that the command is in accordance with the transport protocol HTTP, version 1.1. The Content Type of text/xml specifies that the command is in text format, according to the markup language XML.

The setting of the properties for the command PROPATCH is performed within the identifiers <SET> and </SET>. Furthermore, the delineation of the data types of the properties is also specified with these identifiers. As shown in the example, the property myprop is defined as having the data type bin.base64, and is set to the value y.

Thus, within the example, the data type is specified in the phrase <myprop dt:dt="bin.base64">. According to one embodiment of the invention, the general notation is <x dt:dt=*>, where x is the property and * is the data type of x. It is noted that if a property is specified without a data type—for example, <myprop> instead of <myprop dt:dt="bin.base64">—then the data type defaults to a string data type.

Embodiments of the invention therefore provide for data types of properties. In the example, the data type of a given property is delineated within the command PROPPATCH. The command PROPPATCH is generally used by a client computer so that a server computer with which the client computer is communicating knows the data type of the property communicated by the client computer. However, the invention is not limited to the specification of data types only within the PROPPATCH command.

Other HTTP commands known within the art, for example, are also amenable to the invention. Thus, the PROPFIND and SEARCH commands can be used by a client computer so that the server returns to the client computer the data types of properties, as well as the values for those properties, as can be appreciated by those of ordinary skill within the art. In the context of PROPFIND and SEARCH, the actual format of the command does not vary as per normal HTTP convention, but the response generated by the server in such an instance does change, in that both the property data types and values are specified.

Thus far, data types have been described as being able to have only one value. In the example, the property myprop has the value y, for instance. However, in other cases, multivalued properties are also provided for by embodiments of the invention. For example, a property authors may have two names to signify two authors. Thus, an example such as <authors dt:dt="mv.string">
   <author>Joe Smith </author>
   <author>Bill Williams </author>
   </authors> is allowed under embodiments of the invention. It is noted that the data type of the property authors includes "mv.string" to indicate that this property has multivalues, each value being of type string. Thus, the data type "mv.*" generally specifies that a property has multivalues, each value being of type *.

Methods

In this section of the detailed description, methods according to varying embodiments of the invention are described. The description is made with reference to FIG. 2, which is a flowchart of a computer-implemented method according to one embodiment of the invention. The computer-implemented method is desirably realized at least in part as one or more programs running on a computer— that is, as a program executed from a computer-readable medium such as a memory by a processor of a computer. The programs are desirably storable on a machine-readable medium such as a floppy disk or a CD-ROM, for distribution and installation and execution on another computer. The methods relate to providing data types for properties according to standard request-response protocols such as HTTP.

Figure 2:
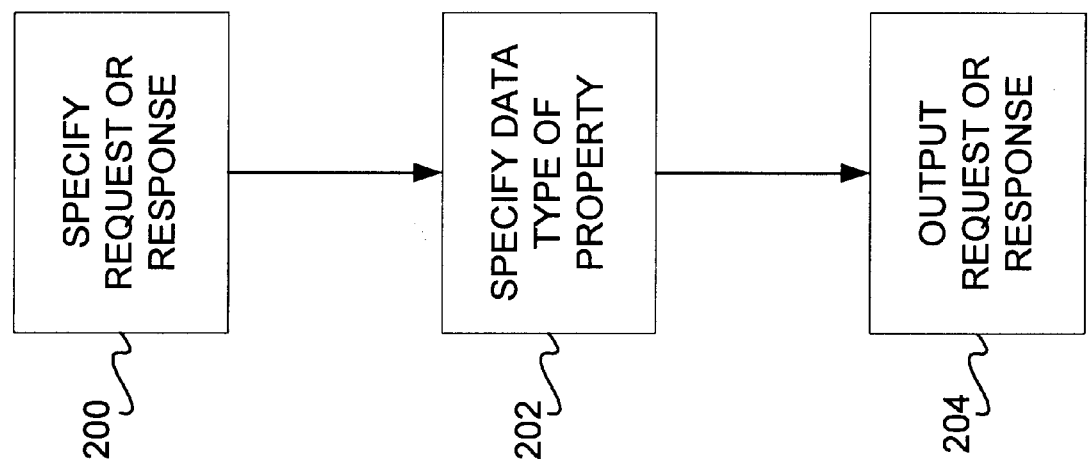
FIG. 2 is a flowchart of a method according to an embodiment of the invention; and, FIG. 3 is a diagram of a system according to an embodiment of the invention.

Referring now to FIG. 2, in 200, a request or a response is specified. A request, for example, may be specified in the case where the method is being performed by a client computer. The request may be in the form of a PROPPATCH command, for example. A response may be specified in the case where the method is being performed by a server computer. The response may be in the form of a response to a PROPFIND command or a response to a SEARCH command received by the server from a client over a network, such as an intranet, an extranet, or the Internet. In one embodiment, 200 includes actually generating the request or the response.

In 202, a data type for a property within the request or the response is specified. The data type may be specified as is described in the preceding section of the detailed description. In one embodiment, 202 also includes setting one or more values for the property. For example, one value may be typically specified, whereas multiple values may be specified for a property that is multivalued, as described in the preceding section of the detailed description. The specification of the data type for the property, as well as the setting of a value(s) for the data type, can be performed at either a client or a server.

Finally, in 204, the request or the response is output, according to a predetermined transport protocol. In one embodiment, the protocol is HTTP. The request or response may also be output according to a predetermined markup language. In one embodiment, the markup language is XML. As used herein, the phrase "according to" with respect to the transport protocol and/or the markup language refers to the request or the response being per the transport protocol and the markup language. For example, the example described in the preceding section of the detailed description was in accordance with both HTTP and XML. Outputting a request can in one embodiment include the submitting of the request from a client to a server over a network, while in another embodiment outputting a response can include the submitting the response from a server to a client over a network.

System

In this section of the detailed description, a description of a system according to an embodiment of the invention is provided. The description is made with reference to FIG. 3. Referring now to FIG. 3, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled to the server 302 via a network 304, such as the Internet, an intranet, or an extranet.

The client 300 sends a request 306 according to a predetermined markup language such as XML and according to a predetermined transport protocol such as HTTP. In one embodiment, the request 306 is generated by an application or other computer program within the client 300 (not shown in FIG. 3), which is then passed onto the mechanism 310 for sending according to the markup language and the transport protocol. The mechanism 310 in one embodiment is a computer program executed by a processor of the client 300 from a computer-readable medium thereof.

In response to receipt of the request 306, the server 302 sends a response 308 according to a predetermined markup language such as XML and according to a predetermined transport protocol such as HTTP. In one embodiment, the response is generated by an application or other computer program within the server 302 (not shown in FIG. 3), which is then passed onto the mechanism 312 for sending according to the markup language and the transport protocol. The mechanism 312 in one embodiment is a a computer program executed by a processor of the server 302 from a computer-readable medium thereof. Either the request 306, the response 308, or both specify a data type for a property, as has been described in preceding sections of the detailed description.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. In a network that includes a plurality of computer systems including a requesting computer system and a resource computer system that are capable of communicating using a transport protocol, the resource computer system maintaining a resource identified by a Uniform Resource Locator (URL), the resource having corresponding property information, a method for the requesting computer system to notify the resource computer system of a data type of a property associated with the resource, the method comprising:

an act of the requesting computer system generating a network message that represents a request to perform an operation on the property associated with the resource;

an act of the requesting computer system including markup language commands in the request in accordance with a markup language, the commands notifying the resource computer system of a data type assigned to the property; and an act of the requesting computer system dispatching the request to the resource computer system according to the transport protocol.

2. The method of claim 1, wherein the transport protocol comprises HTTP (HyperText Transport Protocol).

3. The method of claim 1, wherein the act of the requesting computer system generating a network message comprises generating a PROPPATCH command.

4. The method of claim 1, wherein the act of the requesting computer system generating a network message further comprises an act of generating a request to set a value for the property.

5. The method of claim 1, wherein the act of the requesting computer system generating a network message further comprises an act of generating a request to set multiple values for the property.

6. The method of claim 1, wherein the markup language comprises eXtensible Markup Language (XML).

7. The method of claim 1, wherein the requesting computer system and the resource computer system are communicatively coupled over a network that comprises one of the Internet, an intranet, and an extranet.

8. A computer program product for use in a network that includes a plurality of computer systems including a requesting computer system and a resource computer system that are capable of communicating using a transport protocol, the resource computer system maintaining a resource identified by a Uniform Resource Locator (URL), the resource having corresponding property information, the computer program product for implementing a method for the requesting computer system to notify the resource computer system of a data type of a property associated with the resource, the computer program product comprising one or more machine-readable media having machine-executable instructions stored thereon that, when executed by a processor, perform the following acts:

the requesting computer system generating a network message that represents a request to perform an operation on the property associate with the resource;

the requesting computer system including markup language commands in the request in accordance with a markup language, the commands notifying the resource computer system of at least one data type assigned to the property; and the requesting computer system dispatching the request to the resource computer system according to the transport protocol over a network.

9. The computer program product of claim 8, wherein the markup language comprises eXtensible Markup Language (XML), and the transport protocol comprises HyperText Transport Protocol (HTTP).

10. The computer program product of claim 8, wherein the network comprises one of: the Internet, an intranet, and an extranet.

11. The computer program product in accordance with claim 8, wherein the machine-readable instructions for performing the act of the requesting computer system generating a network message comprise machine-readable instructions for performing the following act:

generating a PROPPATCH command.

12. A computer program product for use in a network that includes a plurality of computer systems including a requesting computer system and a resource computer system that are capable of communicating using a transport protocol, the resource computer system maintaining a resource identified by a Uniform Resource Locator (URL), the resource having corresponding property information, the computer program product for implementing a method for the resource computer system providing notification of a data type of a property associated with the resource in response to a request from the requesting computer system, the computer program product comprising one or more machine-readable media having machine-executable instructions stored thereon that, when executed by a processor, perform the following acts:

the resource computer system generating a network message that represents a response to a request from the requesting computer system, the response including a property associated with the resource;

the resource computer system including markup language commands in the request in accordance with the markup language, the commands notifying of at least one value of a data type for the property; and the resource computer system dispatching the response according to the transport protocol over a network.

13. The computer program product of claim 12, wherein the markup language comprises eXtensible Markup Language (XML), and the transport protocol comprises HyperText Transport Protocol (HTTP).

14. The computer program product of claim 12, wherein the network comprises one of: the Internet, an intranet, and an extranet.

15. The computer program product in accordance with claim 12, wherein the machine-readable instructions for performing the act of the resource computer system generating a network message comprise machine-readable instructions for performing the following act:

generating a response to a PROPFIND command.

16. The computer program product in accordance with claim 12, wherein the machine-readable instructions for performing the act of the resource computer system generating a network message comprise machine-readable instructions for performing the following act:

generating a response to a SEARCH command.

17. A computerized system comprising:

a requesting computer system configured to generate a request, and configured to include markup language commands in the request that notify a resource computer system of a data type of a property associated with a resource in accordance with a markup language, and configured to dispatch the request to the resource computer system according to a transport protocol; and the resource computer system, communicatively coupled to the requesting computer system, configured to generate a response to the request and send the response according to the markup language and according to the transport protocol.

18. The system of claim 17, wherein at least one of the resource computer system and the requesting computer system comprise a computer-readable medium and a processor coupled thereto.

19. The system of claim 17, further comprising a network, such that the resource computer system is communicatively coupled to the requesting computer system over the network.

20. The system of claim 17, wherein the markup language comprises eXtensible Markup Language (XML), and the transport protocol comprises HTTP (HyperText Transport Protocol).

* * * * *

UNITED STATES PATENT AND TRADEMARK OFFICE
CERTIFICATE OF CORRECTION

PATENT NO.   : 6,356,907 B1
DATED        : March 12, 2002
INVENTOR(S)  : Alexander I. Hopmann It is certified that error appears in the above-identified patent and that said Letters Patent is hereby corrected as shown below:

<u>Column 2,</u>
Line 19, after "The part of" change "WEBDav" to -- WebDAV --
Line 65, after "computers, this means that" delete "that"

<u>Column 8,</u>
Line 14, after "in one embodiment a" delete "a"

Signed and Sealed this

Sixth Day of August, 2002

Attest:

Attesting Officer

JAMES E. ROGAN
*Director of the United States Patent and Trademark Office*